(12) United States Patent
Klein

(10) Patent No.: US 10,713,102 B2
(45) Date of Patent: Jul. 14, 2020

(54) UNMANNED GROUND AND AERIAL VEHICLE ATTACHMENT SYSTEM

(71) Applicant: Matias Klein, Eagleville, PA (US)

(72) Inventor: Matias Klein, Eagleville, PA (US)

( * ) Notice: Subject to any disclaimer, the term of this patent is extended or adjusted under 35 U.S.C. 154(b) by 100 days.

(21) Appl. No.: 15/642,010

(22) Filed: Jul. 5, 2017

(65) Prior Publication Data

US 2018/0011751 A1   Jan. 11, 2018

Related U.S. Application Data

(60) Provisional application No. 62/358,561, filed on Jul. 5, 2016.

(51) Int. Cl.
| | | |
|---|---|---|
| *G06F 21/00* | (2013.01) | |
| *G06F 9/54* | (2006.01) | |
| *H04L 29/08* | (2006.01) | |
| *G06F 9/48* | (2006.01) | |
| *G06F 13/42* | (2006.01) | |
| *H04L 29/06* | (2006.01) | |

(52) U.S. Cl.
CPC ............. *G06F 9/547* (2013.01); *G06F 9/485* (2013.01); *G06F 9/54* (2013.01); *G06F 13/4252* (2013.01); *H04L 63/08* (2013.01); *H04L 67/10* (2013.01); *H04L 67/141* (2013.01); *H04L 67/306* (2013.01)

(58) Field of Classification Search
CPC ...... G06F 9/547; G06F 9/485; G06F 13/4252; G06F 9/54; H04L 63/08; H04L 67/10; H04L 67/141; H04L 67/306
See application file for complete search history.

(56) References Cited

U.S. PATENT DOCUMENTS

| | | | |
|---|---|---|---|
| 5,959,423 A | 9/1999 | Nakanishi | |
| 6,263,387 B1 * | 7/2001 | Chrabaszcz | G06F 13/4086 709/220 |
| 6,584,376 B1 | 6/2003 | Kommer | |
| 7,349,758 B2 | 3/2008 | Miro | |
| 9,043,017 B2 | 5/2015 | Jung | |
| 9,223,740 B2 * | 12/2015 | Yu | G06F 13/4081 |
| 9,836,327 B1 * | 12/2017 | Brouwer | G06F 9/5077 |
| 2003/0204700 A1 * | 10/2003 | Biessener | G06F 3/0601 711/202 |
| 2004/0093219 A1 | 5/2004 | Shin | |
| 2004/0098167 A1 | 5/2004 | Yi | |
| 2007/0021867 A1 | 1/2007 | Woo | |
| 2011/0154023 A1 * | 6/2011 | Smith | G06F 21/78 713/155 |
| 2013/0325244 A1 * | 12/2013 | Wang | G05D 1/028 701/26 |
| 2014/0123325 A1 * | 5/2014 | Jung | G06F 21/6254 726/30 |
| 2014/0177737 A1 * | 6/2014 | Vasquez | H02H 1/0092 375/257 |

(Continued)

*Primary Examiner* — Sarah Su
(74) *Attorney, Agent, or Firm* — Pepper Hamilton LLP

(57) ABSTRACT

Techniques are disclosed for hot swapping one or more module devices on a single host device. A module device can perform module-specific tasks that are defined in its module software driver. Using one or more application programming interfaces, the host device communicates with the module device's module software driver to allow the module device to perform module-specific tasks while removably connected to the host device.

17 Claims, 7 Drawing Sheets

(56) References Cited

U.S. PATENT DOCUMENTS

| | | | |
|---|---|---|---|
| 2016/0071313 A1* | 3/2016 | Laine | G06T 15/10 |
| | | | 345/419 |
| 2017/0244787 A1* | 8/2017 | Rangasamy | H04L 41/0654 |
| 2017/0344028 A1* | 11/2017 | Westermo | H04L 67/12 |
| 2018/0276024 A1* | 9/2018 | He | G06F 9/45558 |
| 2019/0013962 A1* | 1/2019 | Taylor | G06F 13/26 |
| 2019/0227154 A1* | 7/2019 | Viswanathan | A61G 5/10 |

* cited by examiner

UNMANNED GROUND AND AERIAL VEHICLE ATTACHMENT SYSTEM

CROSS REFERENCE TO RELATED PATENT APPLICATIONS

This application claims priority to U.S. Provisional Patent Application No. 62/358,561, filed on Jul. 5, 2016, entitled "Unmanned Ground Vehicle System and Method," which is hereby incorporated by reference in its entirety.

BACKGROUND

Various types of unmanned ground vehicles (UGVs), unmanned aerial vehicles (AUVs), and robots for performing a wide variety of human tasks are known in the art. Typically, each UGV, UAV, and/or robot is designed and built to perform a specific task that it is intended to perform. While some UGVs, UAVs, and/or robots can perform several tasks, for example, by software programming, these devices generally cannot perform tasks that fall outside its originally intended scope, for example, tasks that may require new hardware. Thus, multiple devices must be used for performing multiple tasks, or existing UGVs, UAVs, and/or robots must be retrofitted with new hardware, which can be impractical and costly. In this regard, the invention described herein addresses these problems.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
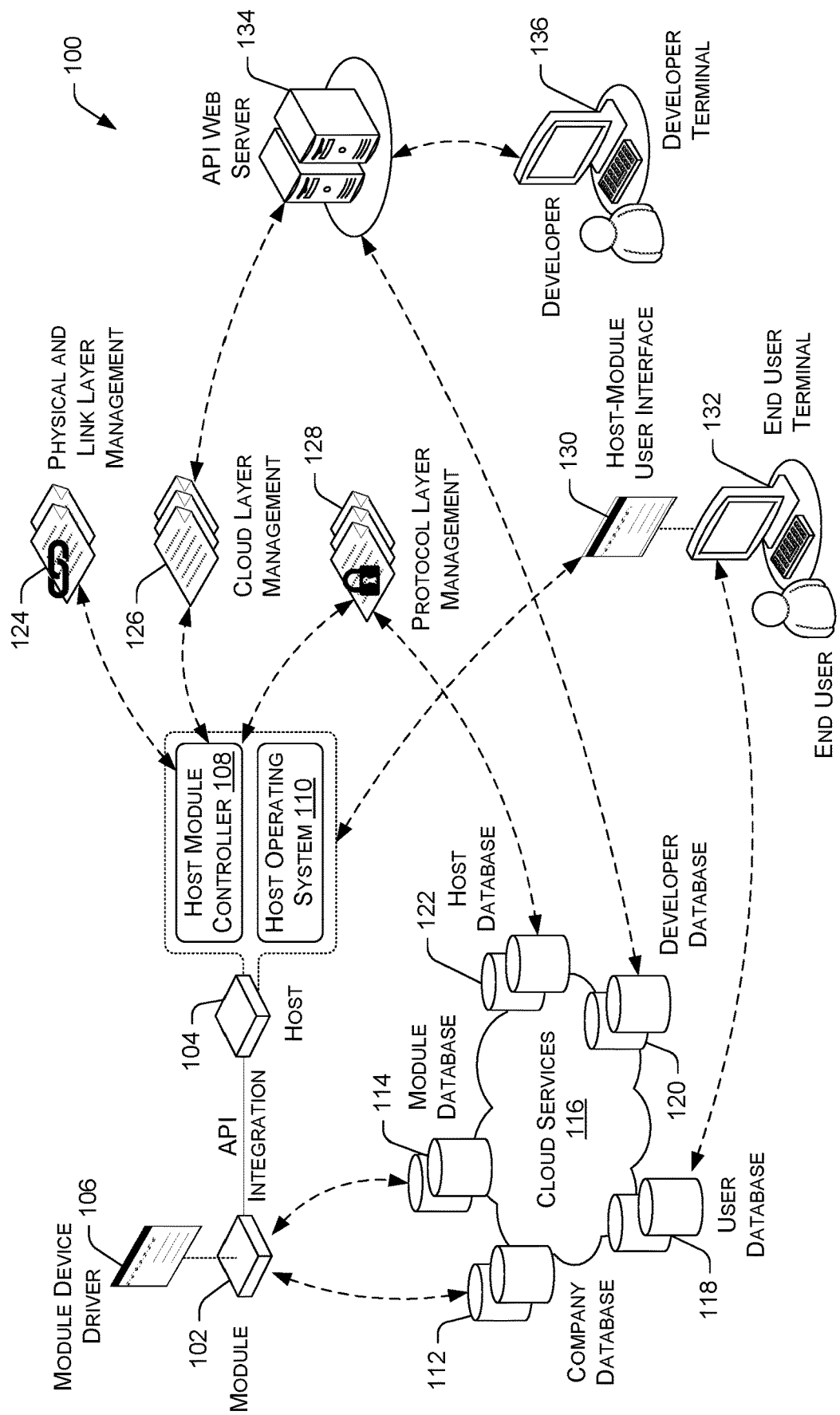
FIG. 1 illustrates an example architecture for performing module management and operation of the present system.

This disclosure is directed to techniques for using a single host device with a plurality of module devices to perform a wide range of tasks, wherein the module devices can be removably attached to the host device, thereby allowing the module devices to be readily swapped or switched in order to alter the functionality of the host device.

In some embodiments, the present system comprises one or more network-enabled UGV and/or UAV, wherein the UGV and/or the UAV comprises a host device and a removably attached module device. The host device comprises a memory unit having instructions stored thereon and a processor for executing the instructions, wherein the processor runs on a host operating system and the processor can be communicably connected to, without limitation, additional data storage (e.g., a cloud-based storage), a communication interface (e.g., for enabling 4G LTC, Wi-Fi, etc.), and input/output (I/O) devices.

The host device further comprises a host module controller that includes a physical and link layer management for managing host-module device connection, a protocol layer management for providing protocol negotiation and security, and a cloud layer management for managing application programming interfaces (APIs).

In exemplary embodiments, the module devices can comprise environment input devices and/or sensors (e.g., an obstacle detector, a Global Positioning System (GPS) receiver, a smoke detector, a temperature sensor, a light sensor, a still photo or video camera, an audio sensor, a velocity sensor, a gyroscope, an accelerometer, a compass, etc.), a mapping apparatus, a vacuum, a lawn mower, and signal generation devices (e.g., speakers), or any combination thereof. Each of the module devices comprises a module device driver that is configured to operate and/or control the module device to perform its respective function and enable the module device to communicate with a host device and/or an end user, via, for example, a user interface on a remote controller.

The host device is compatible to removably attach to operate any of the module devices in order to alter the functionality of a UGV or a UAV. Thus, a single host device can be operable with multiple module devices, for example, via, "hot swapping." The module and the host device can be powered via an onboard battery or a similar power source (e.g., solar panels), wherein the battery or the power source can be charged via a separate charging station on which the host and/or the module device can attach. While each UGV or the UAV is autonomous and can operate independently, some embodiments of the UGVs or UAVs can be optionally operated via a remotely connected computer system such as a mobile device, wherein the mobile device can be configured for remote programming and operating the UGVs or UAVs. In this regard, one module device and/or one host device can communicate with another module device and/or another host device via one or more communication channels in a network environment.

The techniques described herein may be implemented in a number of ways. Example implementations are provided below with reference to the following FIGS. 1-7.

Example Architecture

FIG. 1 illustrates example architecture for performing module management and operation of the present system. The architecture 100 comprises a module device 102 that comprises a module device driver 106 for controlling and/or operating the module device 102 specific task and a host device 104, wherein the host device 104 comprises a host module controller 108 that operates on a host operating system 110 (e.g., iOS™, Windows™, Linux™). The module device driver 106, the host module controller 108, and the host operating system 110 may execute on one or more computing nodes as described in FIG. 2. The computing nodes may be distributed processing nodes that are scalable according to workload demand.

In various embodiments, the computing nodes may include general-purpose computers, such as desktop computers, tablet computers, laptop computers, servers, as well as mobile devices such as smartphones, personal digital assistants (PDAs), e-readers, and so forth. However, in other embodiments, the computing nodes may be in the form of virtual machines, such as virtual engines (VE) and virtual private servers (VPS). The computing nodes may store data in a distributed storage system, in which data may be stored for long periods of time and replicated to guarantee reliability. Accordingly, the computing nodes may provide data and processing redundancy, in which data processing and data storage may be scaled in response to demand. Further, in a networked deployment, new computing nodes may be added on the fly without affecting the operational integrity of the module device driver 106, the host module controller 108, and the host operating system 110.

The host module controller 108 may include a cloud layer management 126 that manages application programming interfaces (APIs) 224 associated with one or more module devices 102, a physical and link layer management 124 for managing hardware resources, and a protocol layer management 128 for managing security, data transmissions and processing, and storage.

The cloud layer management 126 manages APIs 224 for enabling different module devices 102 to operate with a single host device 104 as the module devices 102 are swapped. More specifically, one or more APIs 224 allow a module device driver 106 of a module device 102 to interact with the host device 104 components, including the physical and link layer management 124 and the protocol layer management 128, as well as other components of the present system 100 including any third party applications and/or programs operated by an end user terminal 132 and/or a developer terminal 136 and cloud services 116.

In some embodiments, the cloud layer management 126 can communicate with one or more API web servers 134 which provide API integration, wherein the API web servers 134 can communicate with one or more developer terminals 136. Accordingly, the cloud layer management 126 may facilitate the deployment, configuration, and activation of the host device 104, as well as facilitate the deployment, configuration, and activation of applications and/or services associated with one or more module device driver 106 of the module devices 102.

The physical and link layer management 124 may provide monitoring utilities and managing hardware resources of the module devices 102 and/or the host device 104. The physical and link layer management 124 can detect physical attachment and removal of a module device 102 to the host device 104 and manage electrical input and output communication between the host device 104 and a module device 102. The physical and link layer management 124 can also set each module device 102 its own IP address to facilitate the identification and tracking of each module device 102.

The physical and link layer management 124 also manages or tracks each module device 102 that operate with the host device 104. For instance, the physical and link layer management 124 can save a copy of information associated with each of the module devices 102 as the module devices 102 are added, paired, or linked to operate with the host device 104. The physical and link layer management 124 can also remove the information associated with module devices 102 that are unpaired or unlinked to cease operation with the host device 104. Further, the physical and link layer management 124 can monitor the status of the host device 104 and the module device 102 to which it is connected. For example, the application can monitor the power level and the logical status of the host device 104 and the module device 102.

The protocol layer management 128 is configured to conduct protocol negotiation upon detection of the coupling of a module device 102 to a host device 104. The protocol negotiation includes determining a module device protocol in accordance with the module device driver 106 and reconfiguring the host device 102 to accommodate the module device protocol. The protocol layer management 128 is configured to manage security by using credentials 222 to authenticate module devices 102 and/or end users and providing authorizations to certain module devices 102 and/or end users for operating with the host device 104. In this regard, the protocol layer management can access one or more databases to obtain credentials 222 correlating to one or more module devices 102 and/or end users to provide authentication and authorization.

The protocol layer management 128 may further oversee data transmissions and manage data storage or processing capacity for the host module database 122, data store, and/or other data sources in cloud services 116. The cloud services 116 provide software utilities for managing computing and storage resources. In various embodiments, the cloud services 116 may provide a generic user interface for handling multiple underlying storage services (e.g., local servers) that stores the data collected in various databases and/or data sources. In an exemplary embodiment, the databases and/or data sources comprise a company database 112, a module database 114, a user database 118, a developer database 120, and a host database 122.

The company database 112 may include information relating to the module device manufacturers, the module device distributors, and/or so forth. In some embodiments, information relating to the module device manufacturers and/or the module device distributors comprises product catalog, the manufacturer or the distributor's offerings, origin of the module device, links to the manufacturer or the distributor's website and/or contact information, and the manufacturer or the distributor's terms and policies. In some embodiments, the company database 112 can be in communication with a third party server (e.g., a manufacturer server, a distributor server, a company server, etc.) to update and maintain data in the company database 112. Thus, the company database 112 provides convenient means for retrieving information on the manufacturer and/or the distributor.

Figure 4:
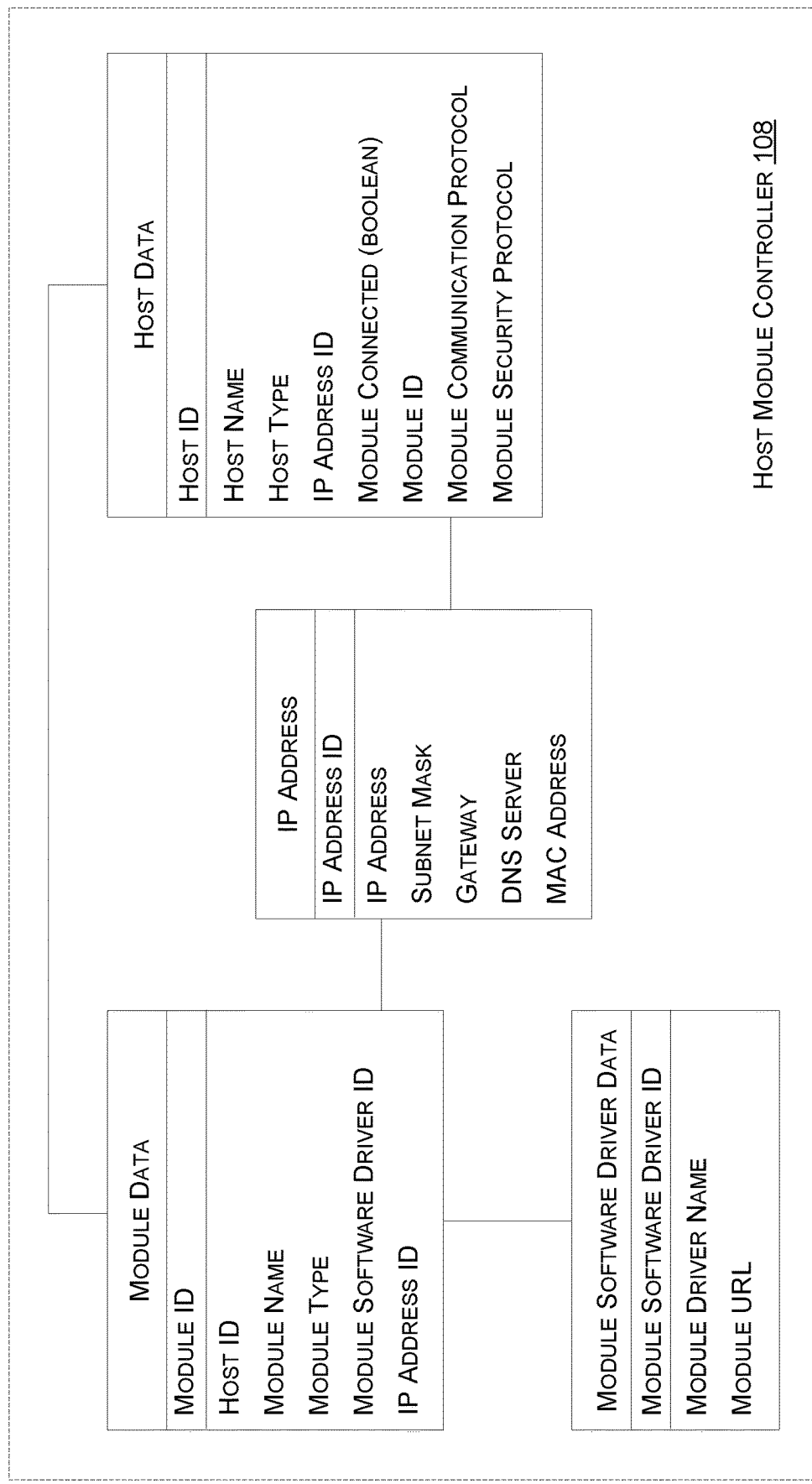
FIG. 4 is an exemplary block diagram of the host, module, and module software driver components of the present system.

The module database 114 includes data relating to the module devices 102, including the module device type, name, model, serial number, settings, protocol (e.g., communication protocol, security protocol, etc.), module identifier or identification (ID), module software driver ID, module device credentials, and IP address (FIG. 4). The module database 114 can also include data relating to the module software driver 106, which include, without limitation, a module software driver ID, module driver name, and module URL. In some embodiments, the module device information may also include technical capabilities, features, and operational statuses of the module devices 102. In some embodiments, the module database 114 may also include performance information about each module device 102. In various embodiments, the performance information may include device event logs, device bug reports, and/or other module device performance information. The performance information on the module devices that are provided by the module database 114 may further include user account information that is associated with the module devices 102 in order to deliver the performance information to the appropriate end user or the end user that operate the module device 102. In some embodiments, the performance information can be delivered to an end user via a host-module user interface 130 at an end user terminal 132.

Similarly, the host database 122 may include data relating to the host devices 104 including the host device type, name, model, serial number, settings, protocol, host ID, modules connected (Boolean), module ID, module communication protocol, module security protocol, host device credentials, and IP address (FIG. 4). The host device information may also include technical capabilities, features, and operational statuses of the host device 104. In some embodiments, the host database 122 may also include performance information about the host device 104. In various embodiments, the performance information may include device event logs, device bug reports, and/or other host device performance information.

The user database 118 may include data relating to end users or clients that operate the host device 104 and/or the module devices 102. The user database 118 can include user account information such as account types, login information (e.g., username, user identifier, password, etc.), billing preferences, service plan subscriptions, if any, payment histories, registered host devices 104 correlating to the user account, registered module devices 102 correlating to the user account, host device and/or module device consumption or use statistics, authentication and authorization details (e.g., user credentials), and/or so forth.

The developer database 120 may include data relating to APIs and/or module device driver 106 for operating and/or controlling the module devices 102. For instance, the developer database 120 may include routines, protocols (e.g., communication protocols, security protocols, etc.), data structures, object classes, variables or remote calls, code segments, and/or tools associated with the APIs and/or the module device driver 106. Additionally, the developer database 120 may include information related to graphical user interface components that are used with the APIs.

In some embodiments, the cloud layer management 126, the physical and link layer management 124, the protocol layer management 128, or a data store component may include software utilities and databases that facilitate the acquisition, processing, storage, reporting, and analysis of data from multiple data sources (e.g., company database 112, a module database 114, a user database 118, a developer database 120, and a host database 122). For example, the cloud layer management 126, the physical and link layer management 124, the protocol layer management 128, and/or the data store component may provide a data access API that provides access to one or more databases and/or data sources in the cloud services 116. The data access API may also be used by custom analytic engines and/or other third party tools to access the data in the different databases.

The cloud layer management 126, the physical and link layer management 124, the protocol layer management 128, and/or the data store component may further include multiple data adaptors that are able to obtain multiple types of data from multiple data sources in the cloud services 116. The cloud layer management 126, the physical and link layer management 124, the protocol layer management 128, and/or the data store component may access the multiple data sources via a network. The network may be a local area network (LAN), a larger network such as a wide area network (WAN), or a collection of networks, such as the Internet. The cloud layer management 126, the physical and link layer management 124, the protocol layer management 128, and/or the data store component may use multiple connectors in the form of applications, APIs, protocols, and services, to support connectivity with data sources and data stores. These connectors may include FTP/SFTP, HTTP/HTTPS, Java™, Apache™, and/or so forth.

Example Computing Device Components

Figure 2:
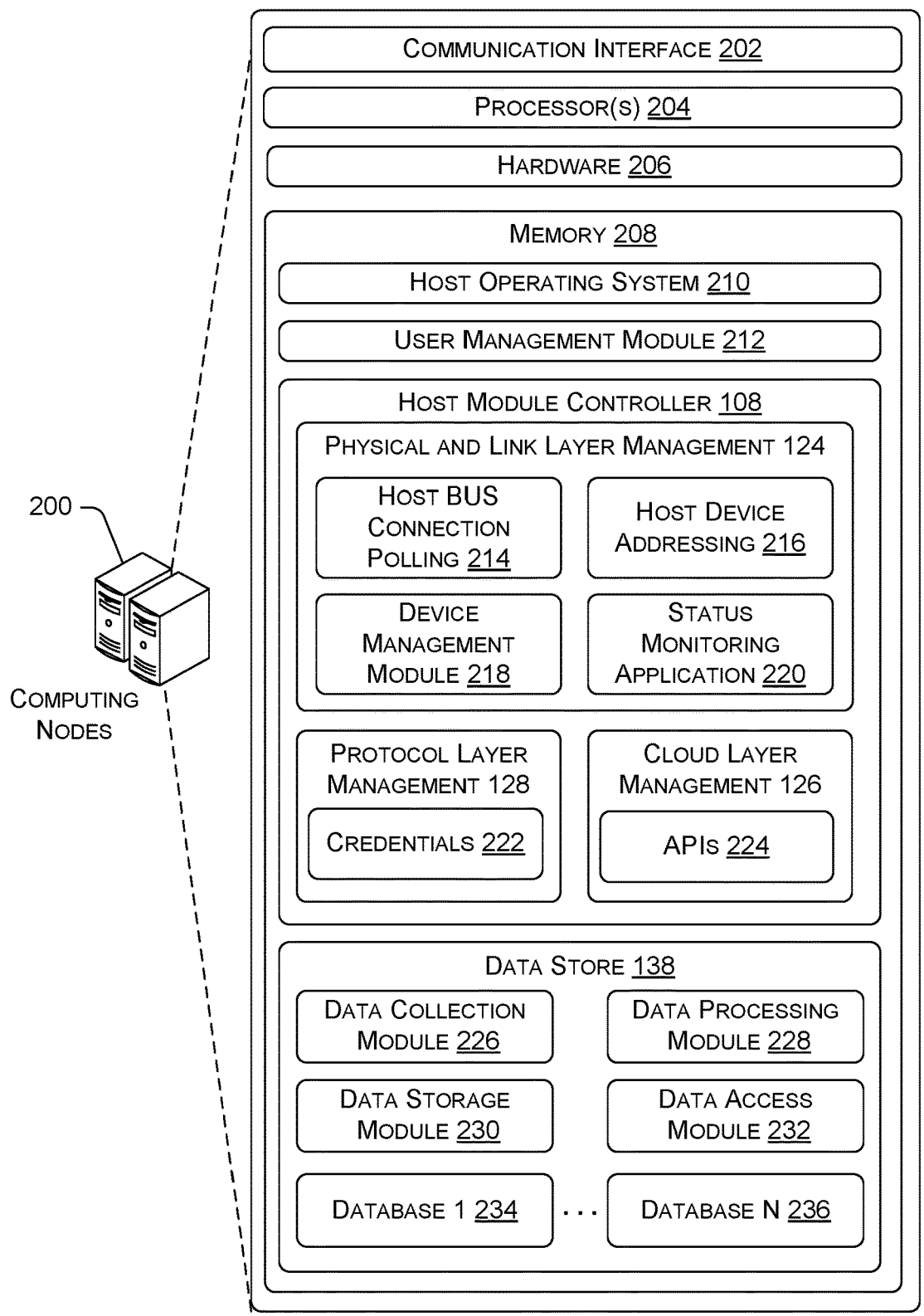
FIG. 2 is an exemplary block diagram showing various components of a host module controller and a data store for performing module-host linking and operation.

FIG. 2 is a block diagram showing various components of a host module controller and a data store for performing module-host linking and operation as described herein. The host module controller and the data store may be implemented by one or more computing nodes 200 of a distributed processing computing infrastructure. The number of computing nodes 200 may be scaled up and down by a distributed processing control algorithm based on the data processing demands of the host module controller, the data store, and/or other components in the system such as module devices. For example, during peak performance data processing times, the number of computing nodes 200 that are executing performance data processing functionalities of the host module controller may be scaled up on the fly based on processing demand. However, once the processing demand drops, the number of computing nodes 200 that are executing the performance data processing functionalities may be reduced on the fly. Such scaling up and scaling down of the number of computing nodes 200 may be repeated over and over again based on processing demand.

The computing nodes 200 may include a communication interface 202, one or more processors 204, one or more hardware 206, and memory 208. The communication interface 202 may provide graphical user interfaces and can include wireless and/or wired communication components that enable the one or more computing nodes 200 to transmit data to and receive data from other networked devices. The computing nodes 200 may be accessed via hardware 206. The hardware 206 may include additional user interface, data communication, or data storage hardware. For example, the user interfaces may include a data output device (e.g., visual display, audio speakers), and one or more data input devices. The data input devices may include but are not limited to, combinations of one or more of keypads, keyboards, mouse devices, touch screens that accept gestures, microphones, voice or speech recognition devices, and any other suitable devices.

The memory 208 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or another transmission mechanism.

The memory 208 may include a host operating system 210 (e.g., iOS™, Windows™, Linux™, etc.), a user management module 212, a host module controller 108, and a data store 138. The modules and the components herein may include routines, program instructions, objects, code segments, and/or data structures that perform particular tasks or implement particular abstract data types.

The user management module 212 is configured to manage user accounts associated with or corresponding to one or more end users, wherein the user management module 212 can create, maintain, process, and analyze data regarding individual end users or user entities for operating the module devices and the host devices. The user management module 212 can keep track of module devices and/or host devices that are associated with a user account in order to generate user data, user consumption data, and/or other usage statistics data and analyze such data in order to provide, for example, performance optimization, troubleshoot and diagnostics, billing, and/or so forth. Further, the user management module 212 can manage user credentials in order to provide authentication and authorization when operating module devices and/or host devices. Thus, the present system can offer additional security by providing authentication and authorization to certain module devices and providing separate authentication and authorization to certain end users to prevent unauthenticated and/or unauthorized users from operating authenticated and authorized module devices with one or more host devices.

The host module controller 108 comprises the physical and link layer management 124, the protocol layer management 128, and the cloud layer management 126. The physical and link layer management 124 comprises host bus connection polling 214, host device addressing 216, device management module 218, and status monitoring application 220.

The host bus connection polling 214 is configured to detect physical attachment and removal of a module device to the host device as well as any electrical input and output communication to and from the host device and a module device. The physical and link layer management 124 further comprises host device addressing 216 for setting each module device its own IP address. In this regard, the host device addressing 216 of the host module controller 108 can store IP addresses 140 and data associated therewith, wherein the IP address 140 can be associated with module devices 102, host devices 104, and/or other devices (e.g., end user terminal, developer terminal, etc.) in the system as depicted in FIG. 4. In some embodiments, the data associated with the IP addresses comprises IP address ID, IP addresses, subnet mask, gateway, DNS server, MAC address, and/or so forth. In this way, the host device can identify and manage each module device more easily during connection, operation, tracking, and/or troubleshoot and diagnostics.

Referring back to FIG. 2, the device management module 218 of the physical and link layer management 124 is configured to save a copy of information associated with each of the module devices, including the module device type, name, model, serial number, settings, protocol, module identifier or identification (ID), module software driver ID, module device credentials, IP address, and/or so forth as module devices are added, paired, or linked to operate with the host device. Conversely, the device management module 218 is configured to remove a copy of the information associated with module devices that are unpaired or unlinked to cease operation with the host device. In this way, the device management module is configured to maintain an active list of module devices that are operable with the host device.

The status monitoring application 220 is configured to monitor the status of the host device and/or the module device to which it is connected. For example, the status monitoring application 220 is configured to monitor the power level of the host device and the module device. Additionally, the status monitoring application is configured to monitor the logical status (e.g., idle, activated, deactivated, etc.) of the host device and the module device.

In some embodiments, the status monitoring application 220 can generate alerts on a host-module user interface based on predetermined alert rules customized by an end user via the end user terminal or set by default via the developer terminal. For instance, an alert rule may specify that an alert is to be triggered when one or more conditions with respect to the operations of the module device occur (e.g., low battery, disconnected from a communication network, damage to hardware, etc.). The conditions may be specific faults or issues that are detected with components of the module device, deviation of actual performance indicators from predetermined threshold performance values, and/or so forth.

The protocol layer management 128 is configured to conduct protocol negotiation upon detection of the coupling of a module device to a host device (e.g., during start-up, reboot, or plug-in). The protocol negotiation includes determining a module device protocol (e.g., in accordance with the module device driver) and reconfiguring the host device to accommodate the module device protocol. Additionally, the protocol layer management 128 is configured to manage security by authenticating module devices and/or end users via credentials and authorizing certain module devices and/or end users to operate with the host device. The protocol layer management 128 is further configured to manage data transmissions and data storage or processing capacity for the host module database, data store, and/or other data sources in the cloud services.

The cloud layer management 126 manages APIs for enabling different module devices to operate with a single host device. More specifically, one or more APIs allow a module device driver of a module device to interact with the host device, including the physical and link layer management 124 and the protocol layer management 128, as well as other components of the present system including any third party applications and/or programs operated by an end user terminal and/or a developer terminal and cloud services.

The data store 138 comprises a data collection module 226, data processing module 228, data storage module 230, a data access module 232, and one or more databases 234, 236. The data collection module 226 may use data adaptors to retrieve data from the structured or unstructured databases of the data sources described above (e.g., company database, module database, user database, developer database, host database). Because the structured databases can provide data that are accessible via simple data retrieval algorithms, the data collection module can use data-agnostic data adaptors to access the data sources without taking into consideration the underlying content of the data. Further, changes to the data content in each data source do not affect the functionality of the corresponding data-agnostic data adaptors. Alternatively, the data collection module 226 may use database-specific data adaptors to access structured databases.

In some embodiments, the data collection module 226 may include a workflow scheduler that periodically checks for and retrieves newly available data from the multiple data sources. The workflow scheduler may handle the extraction and the handling of the data based on configurable policies (e.g., by an end user using a host-module user interface, a developer, an administrator, and/or an administrative entity). For example, a configurable policy may specify the source data location, frequency of data retrieval, data retention period, and data disposal following an expiration of the data retention period.

In various embodiments, the data processing module 228 may implement adaptor-specific logics to decode the format of various data from respective data sources. Accordingly, data from one data source may be fed into other data sources, modules, and/or components for analysis and storage.

The data storage module 230 may store data across multiple virtual data storage clusters with redundancy, so that the data may be optimized for quick access. For example, user database and the module database can also be partially replicated on the host device. The data access module 232 may provide a data access API for accessing the data stored in the multiple virtual storage clusters. Accordingly, the data access API may be used by the host module controller as well as other third-party application to obtain desired data and operate or control a module device to which a host module is attached.

Figure 3:
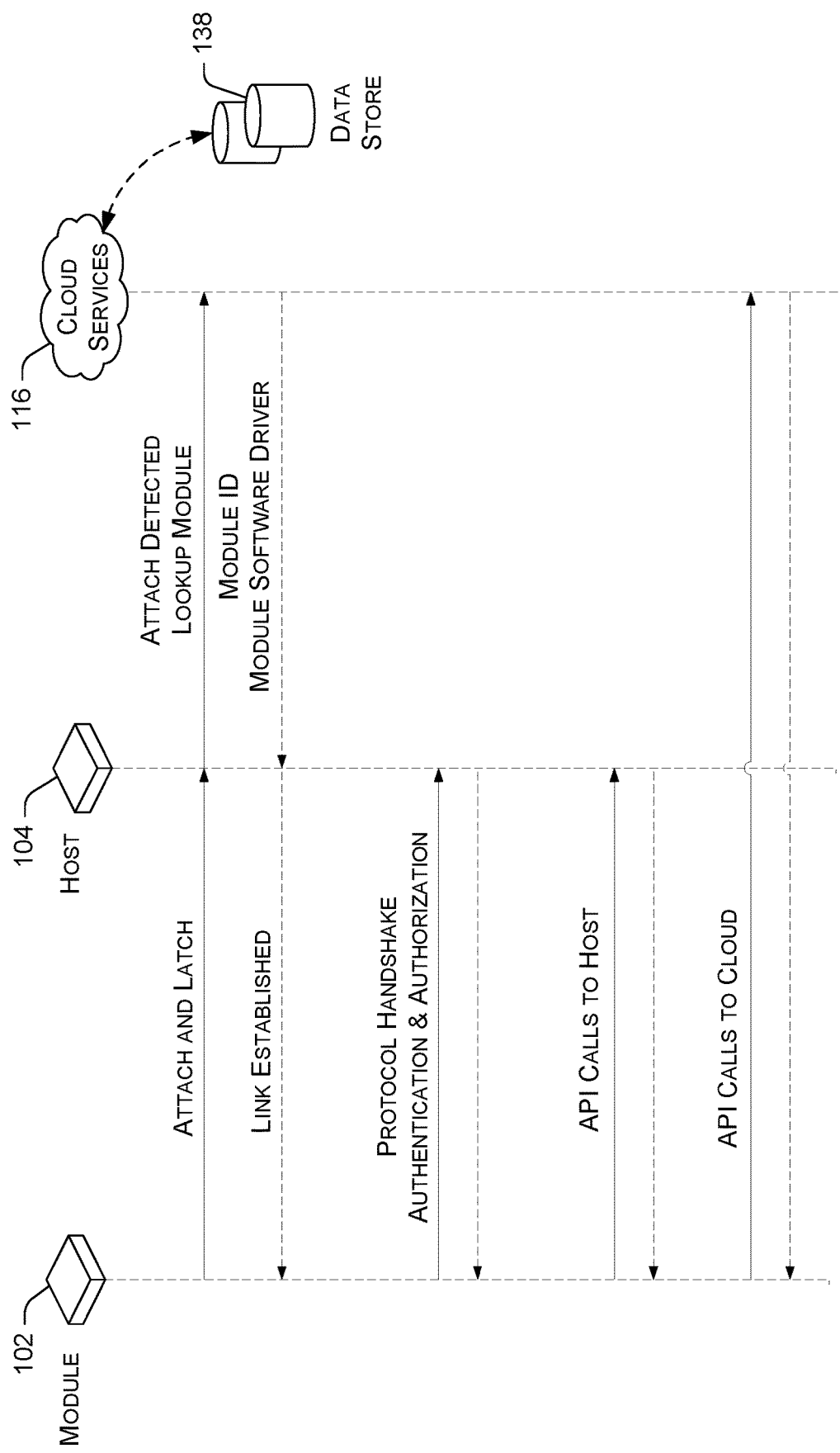
FIG. 3 is an exemplary logic circuit diagram for performing module-host linking and operation.

FIG. 3 is a logic circuit diagram for performing module-host linking and operation. As described above, each module device 102 is removably attached to a host device 104 so as to allow hot swapping, thereby enabling a single host 104 to operate with one or more module devices 102. Once a module device 102 is attached and securely latched to the host device 104, the host device 104 is configured to detect attachment via the host bus connection polling of the physical and link layer management. The detection of physical attachment to the module device 102 prompts the host device 104 to identify the module device 102 via module identification and request the cloud services 116 for information relating to the module device 102. The cloud services 116 can use the module identification to locate and retrieve a module software driver correlating to the module identification from a module database and/or a data store 138 hosted on the cloud services 116. Upon receiving the module software driver from the cloud services 116, the host 104 is able to establish a communication link with the module device 102.

After the communication link is established, the module device 102 requests a protocol handshake with the host device 104 in order to enable the host device 104 to authenticate the module device 102 and vice versa. Additionally, the module device 102 requests the protocol handshake to enable the host device 104 to authorize the module device 102 and vice versa to operate the module device 102 with the host device 104. It is noted that various handshake protocol of a secure communications standard (e.g., secure sockets layer (SSL), transport layer security (TLS)) can be used, depending upon embodiments. Once the protocol handshake is completed and the module device 102 receives authentication and authorization, the module device 102 makes API calls to the host device 104 and the host device 104 returns the API calls to the module device 102. In some embodiments, the module device 102 can make API calls to the cloud services 116 concurrently and the cloud services 116 can return the API calls to the module device 102.

Example Processes

Figure 5:
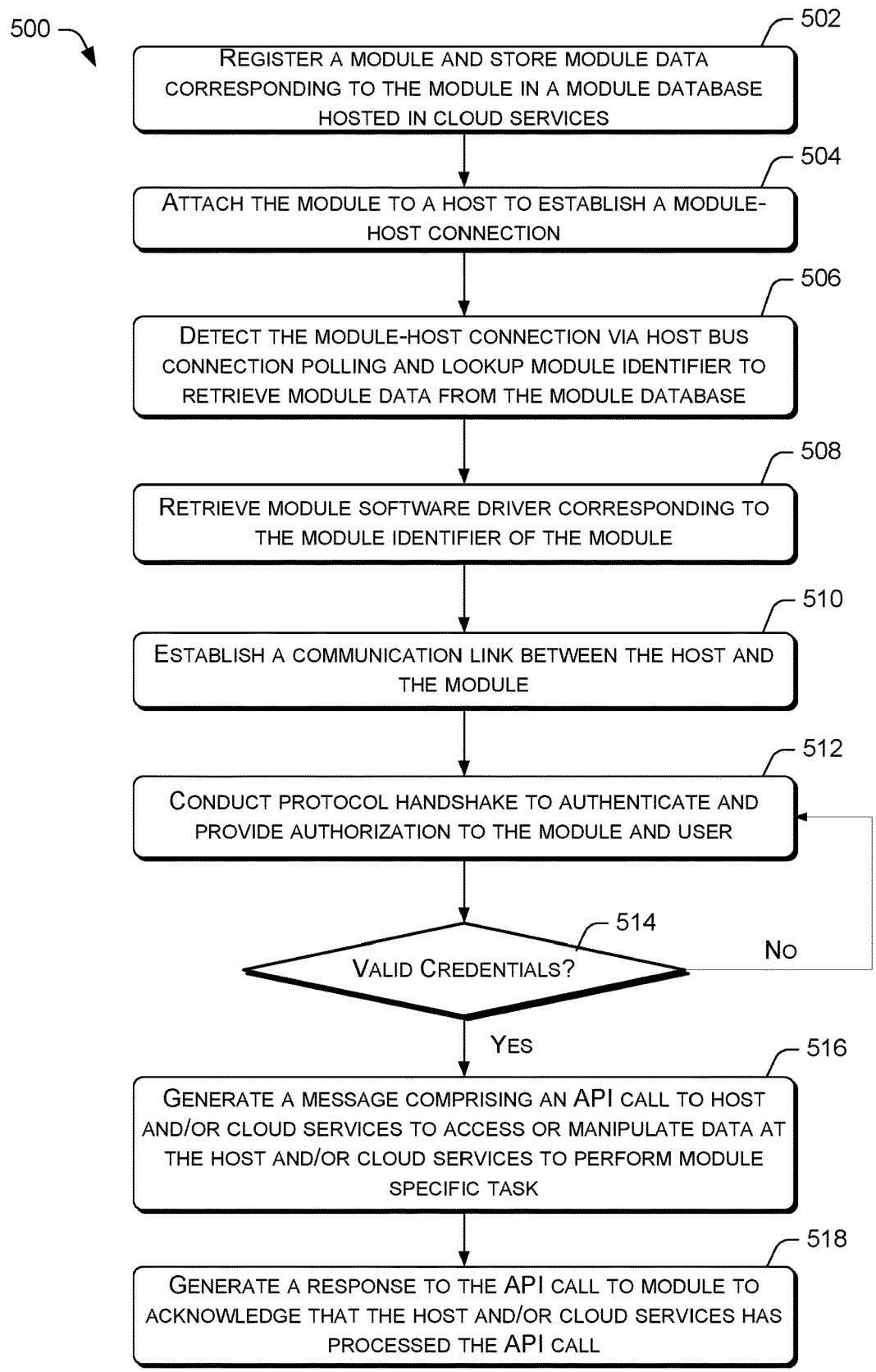
FIG. 5 is a flow diagram of an example process for performing module management and module-host linking for operating the present system.
Figure 6:
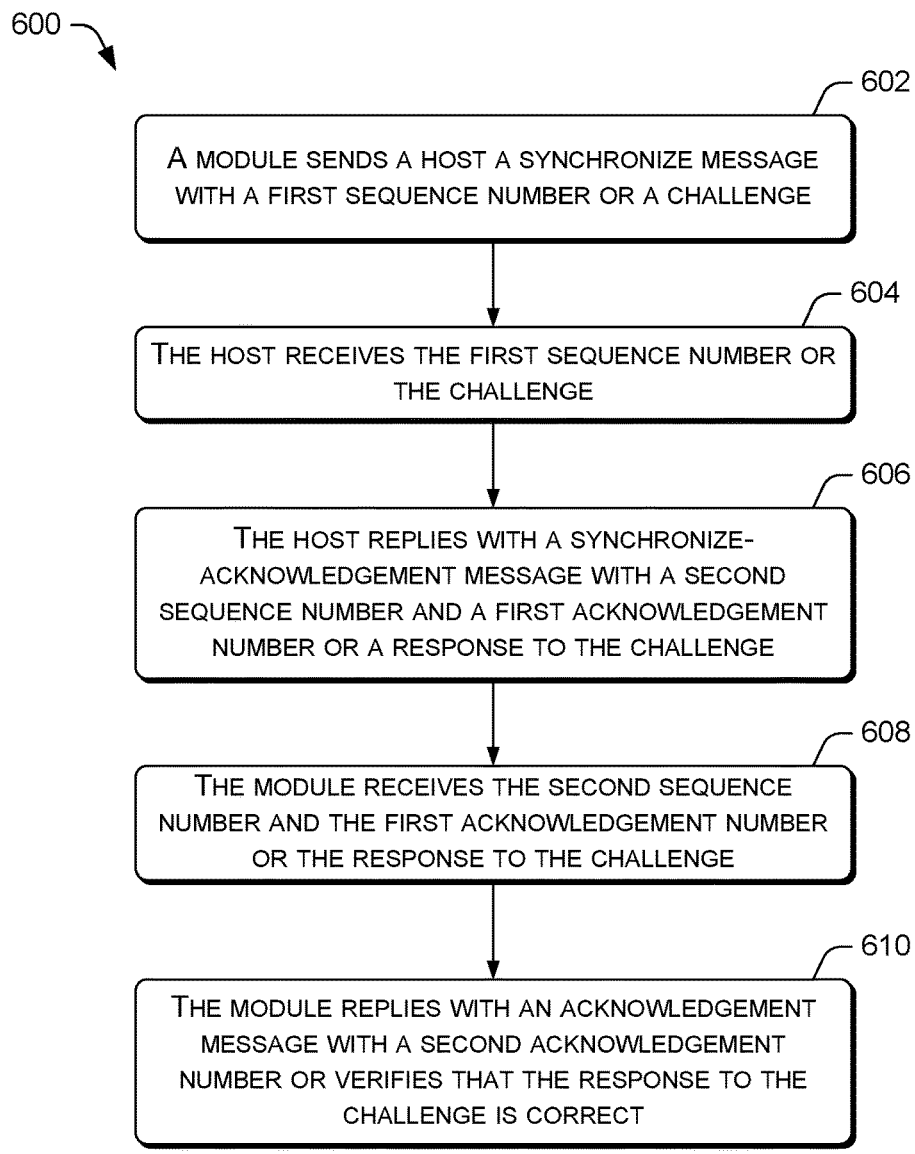
FIG. 6 is a flow diagram of an example process for performing protocol handshake.
Figure 7:
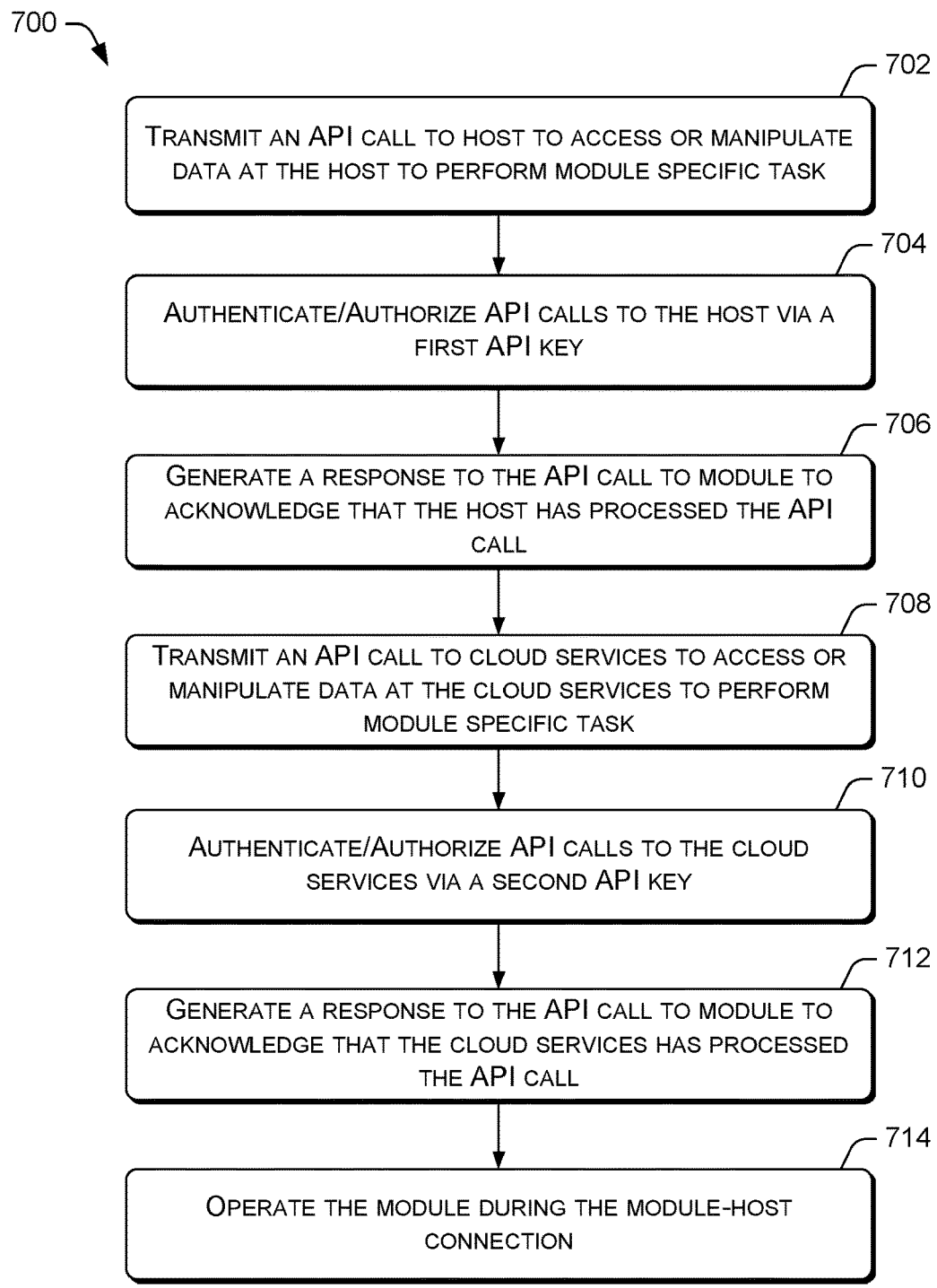
FIG. 7 is a flow diagram of an example process for performing API calls.

FIGS. 5-7 present illustrative processes for performing example process for performing module management and module-host linking for operating the present system. Each of the processes is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in a mirror to implement the process. For discussion purposes, the processes herein are described with reference to FIGS. 1-4.

FIG. 5 is a workflow of an example process for performing module management and module-host linking for operating the present system 500. As indicated in block 502, a module device is registered in the data store (e.g., by a developer) and data associated with the module device is stored in the module database that is hosted in the cloud services. As indicated in block 504, the module device is attached to a host device to establish a physical module-host connection. As indicated in block 506, the host bus connection polling of the physical and link layer management of the host module controller detects the physical module-host connection and identifies the module device in order to retrieve a module software driver and/or other module device data from the module database hosted in the cloud services. In this regard, the host bus connection polling can identify the module device via the module device identification or the host device addressing can identify the module device via the module device IP address.

As indicated in block 508, the host device retrieves the module software driver corresponding to the module device's module identification. The module device identification or the module device IP address is used to identify a module software driver that corresponds to the module device identification or the module device IP address. In some embodiments, the module software driver also comprises an identification, wherein the module software driver identification can correspond with one or more module device identification and/or module device IP address to facilitate retrieval of the module software driver and/or other relevant module device data. As indicated in block 510, the host device and the module device can establish a communication link via an API associated with the module software driver of the module device in order to operate the module device together with the host device.

As indicated in block 512, the module device initiates a protocol handshake. In this regard, the host device can determine the module device's protocol and reconfigure the host device as needed to accommodate the module device's protocol. FIG. 6 is a workflow of an example process for performing protocol handshake 600. As indicated in block 602, a module device sends a host device a synchronize message with a first sequence number, code, or a challenge. As indicated in block 604, the host device receives the first sequence number, code, or challenge. As indicated in block 606, the host device replies with a synchronize-acknowledgment message with a second sequence number and a first acknowledgment number or a response to the challenge.

As indicated in block 608, the module device receives the second sequence number and the first acknowledgment number or the response to the challenge. As indicated in block 610, the module device replies with an acknowledgment message with a second acknowledgment number or verifies that the response to the challenge is correct. Thereafter, a response from the host device is not necessary. In some embodiments, the protocol negotiation can initiate and complete prior to opening communication between the host device and the module device. In this regard, the normal operation of the host device and/or the module device can be suspended (i.e., the module device cannot perform its module-specific task while connected to the host device) until the protocol negotiation is completed.

Returning now to FIG. 5, the module device and/or the end user is authenticated via credentials and receives authorizations to operate the host device together with the module devices. At decision block 514, the protocol layer management determines if the credentials associated with the module device and/or the end user is valid. In this regard, the protocol layer management can request for credentials associated with the module device and/or the end user from a module database and/or a user database, respectively. If the credentials are not valid, the module device and/or the end user is re-authenticated and re-authorized until the credentials are valid.

As indicated in block 516, the module device generates a message comprising an API call to the host device and/or the cloud services to access or manipulate data at the host device and/or the cloud services to perform a module-specific task associated with the module device. As indicated in block 518, the host device and/or the cloud services generate a response to the API call to the module devices to acknowledge that the host device and/or the cloud services have processed the API call. The response message can also include the results of the processing. Thereafter, the module device can perform its module specific task while attached to the host device.

FIG. 7 is a workflow of an example process for performing API calls 700. As indicated in block 702, the module device transmits an API call to the host device to access or manipulate data (i.e., reconfigure) at the host device to perform a module-specific task. For example, the module device can transmit an API call to the host device to change the Boolean data for module device connected to a "true" value. As indicated in block 704, the protocol layer management of the host module controller can authenticate and authorize the API call via a first API key. As indicated in block 706, the host device generates a response to the API call to the module device to acknowledge that the host device has processed the API call.

As indicated in block 708, the module device can also transmit an API call to the cloud services to access or manipulate data at one or more databases hosted on the cloud services to perform module specific task. For example, the module device can transmit an API call to the cloud services obtain data related to the host device or an end user. As indicated in block 710, the cloud services can authenticate and authorize the API call via a second API key. As indicated in block 712, the cloud services generate a response to the API call to the module device to acknowledge that the cloud services have processed the API call. As indicated in block 714, the module device can perform module-specific tasks while connected to the host device.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:
   establishing a module-host connection between a module device and a robot when the module device is installed in a housing member mounted on a chassis of the robot;
   detecting said module-host connection via a host bus connection polling;
   identifying a module device identifier associated with said module device;
   retrieving a module software driver correlating to said module device identifier from cloud services remote from module device and the robot, wherein (i) said module software driver defines a module-specific task corresponding to said module device and (ii) the module-specific task includes mapping a designated geographic area around the robot; and
   generating a message comprising an API call from said module device to said host device to enable said module device to perform said module-specific task while connected to said host device, wherein the module device uses the API call to access data or manipulate data at the host device to perform the module-specific task.

2. The one or more non-transitory computer-readable media of claim 1, wherein the acts further comprise:
   generating a message comprising a second API call from said module device to the cloud services to access one or more databases hosted on said cloud services.

3. The one or more non-transitory computer-readable media of claim 1, wherein said module device identifier is stored in a module database hosted on said cloud services.

4. The one or more non-transitory computer-readable media of claim 1, wherein the acts further comprise:
   registering said module device in a module database hosted on the cloud services.

5. The one or more non-transitory computer-readable media of claim 1, wherein the acts further comprise:
   suspending said module device from performing said module-specific task until a handshake protocol is completed between said module device and said host device.

6. The one or more non-transitory computer-readable media of claim 1, wherein the acts further comprise:
   retrieving user data associated with said module device, wherein said user data comprises user account information, further wherein said user account information comprises credentials for authenticating a user corresponding to said user data;
   validating said user credentials to obtain authorization to enable said user to operate said module device.

7. A system, comprising:
   a robot comprising a chassis and a housing member mounted on the chassis;
   a memory unit having instructions stored thereon;
   a processor operatively connected to said memory unit for executing said instructions to perform an operation for hot swapping a module device on a single host device, the operation comprising:
   establishing a module-host connection between a module device and the robot when the module device is installed in the housing member;
   detecting said module-host connection via a host bus connection polling;
   identifying a module device identifier associated with said module device;
   retrieving a module software driver correlating to said module device identifier from cloud services remote from module device and the robot, wherein said module software driver defines a module-specific task corresponding to said module device;

performing a handshake protocol to authenticate and authorize said module device to operate said module device while connected to said host device; and generating a message comprising an API call from said module device to said host device to enable said module device to perform said module-specific task, wherein the module device uses the API call to access data or manipulate data at the host device to perform the module-specific task.

8. The system of claim 7, wherein the operation further comprises:

generating a message comprising a second API call from said module device to the cloud services to access one or more databases hosted on said cloud services.

9. The system of claim 7, wherein the module device identifier is stored in a module database hosted on said cloud services.

10. The system of claim 7, wherein the operation further comprises:

registering said module device in a module database hosted on the cloud services.

11. The system of claim 7, wherein the operation further comprises:

suspending said module device from performing said module-specific task until said handshake protocol is completed.

12. The system of claim 7, wherein the operation further comprises:

retrieving user data associated with said module device, wherein said user data comprises user account information, further wherein said user account information comprises credentials for authenticating a user corresponding to said user data;

validating said user credentials to obtain authorization to enable said user to operate said module device.

13. A system, comprising:

a module device comprising a module software driver that defines a module-specific task corresponding to said module device, wherein said module device comprises a module identifier;

a network-enabled unmanned vehicle comprising a housing member mounted on a chassis and a host module controller;

cloud services for hosting one or more databases remote from module device and the network-enabled unmanned vehicle;

wherein said host module controller is configured to:

establish, by a host bus connection polling of said host module controller, a connection between said network-enabled unmanned vehicle and said module device when the module device is installed in the housing member;

retrieve said module software driver corresponding to said module identifier of said module device from the cloud services;

authenticate, by a protocol layer management of said host module controller, said module device;

provide, by said protocol layer management, authorization to said module device to establish a secure communication connection to said network-enabled unmanned vehicle; and receive API calls from said module device to reconfigure said network-enabled unmanned vehicle to enable said module device to perform said module-specific task when said module device is connected to said network-enabled unmanned vehicle, wherein the module device uses the API calls to access data or manipulate data at the network-enabled unmanned vehicle to perform the module-specific task.

14. The system of claim 13, wherein said module device is removably attached to said network-enabled unmanned vehicle and secured to the housing member using one or more straps.

15. The system of claim 13, wherein said host module controller is further configured to:

assign, by a host device addressing of said host module controller, an Internet protocol address specific to said module device.

16. The system of claim 13, wherein said host module controller is further configured to:

manage one or more application programming interfaces (APIs) via a cloud layer manager of said host module controller to integrate APIs when allowing said module device to perform said module-specific task when said module device is connected to said network-enabled unmanned vehicle.

17. The system of claim 13, wherein said host module controller is further configured to:

obtain, by said protocol layer management, credentials corresponding to an end user to provide authentication and authorization to allow said end user to operate said module devices to perform said module-specific task when said module device is connected to said network-enabled unmanned vehicle.

* * * * *